(12) United States Patent
Leurer et al.

(10) Patent No.: US 7,664,602 B2
(45) Date of Patent: Feb. 16, 2010

(54) METHOD AND APPARATUS FOR QUANTITATIVE DETERMINATION OF SEDIMENT PHYSICAL PROPERTIES OF SEABED AND LAYERED SUBBOTTOM USING SINGLE-CHANNEL SEISMIC-REFLECTION PROFILING DATA

(75) Inventors: Klaus Christian Leurer, Galway (IE); Colin Brown, Galway (IE)

(73) Assignee: National University of Ireland, Galway (IE)

( * ) Notice: Subject to any disclaimer, the term of this patent is extended or adjusted under 35 U.S.C. 154(b) by 289 days.

(21) Appl. No.: 11/678,306

(22) Filed: Feb. 23, 2007

(65) Prior Publication Data

US 2008/0040043 A1    Feb. 14, 2008

(30) Foreign Application Priority Data

Feb. 24, 2006    (IE)    .............................. S2006/0137

(51) Int. Cl.
*G01V 1/00*    (2006.01)
*G01V 1/28*    (2006.01)
*G01V 1/38*    (2006.01)
*G06F 17/10*    (2006.01)

(52) U.S. Cl. ............................. 702/14; 702/17; 702/18; 367/21; 367/38; 367/47; 703/2; 703/6

(58) Field of Classification Search .................. 702/14, 702/17, 18; 367/21, 38, 47; 703/2, 6
See application file for complete search history.

(56) References Cited

U.S. PATENT DOCUMENTS

| | | | | |
|---|---|---|---|---|
| 4,679,174 A | * | 7/1987 | Gelfand | ........................ 367/73 |
| 4,916,616 A | * | 4/1990 | Freedman et al. | ............. 702/13 |
| 5,815,465 A | | 9/1998 | Turgut | |
| 5,991,236 A | * | 11/1999 | Yamamoto | .................... 367/41 |
| 6,061,300 A | | 5/2000 | Yamamoto | |
| 6,289,284 B1 | * | 9/2001 | Yamamoto | .................... 702/14 |
| 6,665,615 B2 | * | 12/2003 | Van Riel et al. | ................. 702/2 |
| 6,985,838 B1 | * | 1/2006 | Jarchow | ........................ 703/5 |

OTHER PUBLICATIONS

Stoll, R.D., 1985, Sediment acoustics, in: Battacharji, S. Friedman, G.M., Neugebauer, H. J., and Seilacher, A. (Eds.) Lecture Notes in Earth Sciences, vol. 26, New York: Springer.

(Continued)

*Primary Examiner*—Eliseo Ramos Feliciano
*Assistant Examiner*—Janet L Suglo
(74) *Attorney, Agent, or Firm*—Lando & Anastasi, LLP

(57) ABSTRACT

A method for the quantitative characterization of a seabed sediment composition and a seabed's layered subbottom structure from at least one normal-incidence, single-channel reflection acoustic amplitude time series seismogram is disclosed. The method detects a plurality of reflections from subbottom interfaces in said seismograms, determines the traveltime, the polarity and the reflectivity of each detected reflection, determines the intrinsic attenuation of the sediment layer between pairs of adjacent reflections, and determines the acoustic properties, layer thicknesses and material properties of the seabed's layered subbottom structure as a function of said traveltimes, polarities and reflectivities of the detected reflections and said intrinsic attenuation of the sediment layer between pairs of adjacent reflections. A forward model describing the physical relationship between the material properties and the acoustic properties of seabed sediments is also disclosed.

38 Claims, 8 Drawing Sheets

OTHER PUBLICATIONS

Cole K.S., and Cole, R.H., 1941, Dispersion and absorption in dielectrics, J. Chem. Phys., vol. 9, pp. 341-351.

Hertz, H.R., 1882, Uber die Beruhung fester elastischer Korper, Z. Reine Angew. Math., vol. 92, pp. 156-171.

Holler, P., and Kassens, H., 1989, Sedimentphysikalische Eigenschaften aus dem Europaischen Nordmeer (Datenreport F.S. Meteor, Reise 7). Ber. Sonderforschungsbereich 313, University of Kiel, 15, pp. 1-61.

Mavko, G., and Nur, A., 1975, Melt squirt in the asthenophere, J. Geophys. Res., vol. 80, No. 11, pp. 1444-1448.

Mavko, G., Mukerji, T. and Dvorkin, J., 1998, "The Rock Physics Handbook", Cambridge University Press.

Mindlin, R.D., "Compliance of Elastic Bodies in Contact", J. Applied. Mech., Sep. 1949, pp. 259-268.

O'Connor, B., 1991, The use of hydrodynamic mathematical models in predicting types of subtidal macro-faunal communities, in: Modelling the benthos, Report: Cost 647 'Coastal Benthic Ecology', Yerseke, Netherlands, Mar. 20-22, 1991.

Stoll, R.D., "Acoustic Waves in Saturated Sediments, in: Physics of sound in marine sediments," L. Hampton (ed.), New York: Plenum Press., pp. 19-39.

Walton, K., 1987, "The effective elastic moduli of a random pack of spheres," J. Mech. and Phys. Solids, vol. 35, No. 2., pp. 213-226.

Winkler, K., Nur. A., and Gladwin, M. 1978, "Friction and seismic attenuation in rocks," Nature, v. 277, pp. 528-531.

Wood, A.B., and Weston, D.E., 1964, "The propogation of sound in mud," Acustica, vol. 14, pp. 152-162.

Wu, T.T., 1966, "The effect of inclusion shape on the elastic moduli of a two-phase material," International Journal of Solids and Structures, vol. 2, pp. 1-8.

Biot, M. A., "Theory of Propagation of Elastic Waves in a Fluid-Saturated Porus Solid. I. Low-Frequency Range.", The Journal of The Acoustical Society of America, vol. 28, No. 2, Mar. 1956, pp. 168-178.

Biot, M. A., "Theory of Propagation of Elastic Waves in a Fluid-Saturated Porous Solid. II. Higher Frequency Range.", The Journal of The Acoustical Society of America, vol. 28, No. 2, Mar. 1956, pp. 179-191.

Michael J. Buckingham, "Theory of acoustic attenuation, dispersion, and pulse propagation in unconsolidated granular materials including marine sediments," J. Acoust. Soc. Am. 102, No. 5, Pt. 1, Nov. 1997, pp. 2579-2596.

Jack Dvorkin and Mario A. Gutierrez, "Textural sorting effect on elastic velocities, part II: elasticity of a bimodal grain mixture.", SEG Int'l Exposition and Annual Meeting, San Antonio, Texas, Sep. 9-14, 2001.

Jack Dvorkin and Amos Nur, "Dynamic poroelasticity: A unified model with the squirt and the Biot mechanisms.", Geophysics, vol. 58, No. 4, Apr. 1993, pp. 524-533.

Edwin L. Hamilton, "Compresional-Wave Attenuation in Marine Sediments," Geophysics, vol. 37, No. 4., Aug. 1972, pp. 620-646.

Charles W. Holland and Burlie A. Brunson, "The Biot-Stoll sediment model: An experimental assessment," J. Acoust. Soc. Am.84(4), Oct. 1988, pp. 1437-1443.

Klaus C. Leurer, "Attenuation in fine-grain marine sediments: Extension of the Biot-Stoll model by the "effective grain model" (EGM)," Geophysics, vol. 62, No. 5, Sep.-Oct. 1997, pp. 1465-1479.

Klaus C. Leurer, "Compressional- and shear-wave velocities and attenuation in deep-sea sediment during laboratory compaction," J. Accoust. Soc. Am. 116(4), Pt. 1, Oct. 2004, pp. 2023-2030.

Klaus C. Leurer, Jack Dvorkin, "Intergranular squirt flow in sand: grains with viscous cement," International Journal of Solids and Structures 37 (2000) pp. 1133-1144.

Klaus C. Leurer, Jack Dvorkin, "Viscoelasticity of precompacted unconsolidated sand with viscous cement," Geophysics, vol. 71, No. 2 (Mar.-Apr. 2006), pp. T31-T40.

D. Marion, A. Nur, H. Yin and D. Han, "Compressional velocity and porosity in sand-clay mixtures," Geophysics, vol. 57, No. 4 (Apr. 1992), pp. 554-563.

E. G. McLeroy and A. DeLoach, "Sound Speed and Attenuation, from 15 to 1500 kHz, Measured in Natural Sea-Floor Sediments," J. Acoust. Soc. Am., May 2, 1968, vol. 44, No. 4, pp. 1148-1150.

Robert D. Stoll, "Marine sediment acoustics", J. Acost. Soc. Am. 77(5), May 1965.

Altan Turgut and Tokuo Yamamoto, "Synthetic seismograms for marine sediments and determination of porosity and permeability," Geophysics. vol. 53, Nol 8 (Aug. 1988); pp. 1056-1067.

Altan Turgut, "Approximate expressions for viscous attenuation in marine sediments: Relating Biot's "critical" and "peak" frequencies," J. Acoust. Soc. Am 108(2), Aug. 2000.

* cited by examiner

METHOD AND APPARATUS FOR QUANTITATIVE DETERMINATION OF SEDIMENT PHYSICAL PROPERTIES OF SEABED AND LAYERED SUBBOTTOM USING SINGLE-CHANNEL SEISMIC-REFLECTION PROFILING DATA

RELATED APPLICATIONS

This application claims foreign priority benefits under 35 U.S.C. §119(a)-(d) of the Ireland Short-Term Patent Application number S2006/0137, filed Feb. 24, 2006, entitled "Improved Seismic Profiling", herein incorporated by reference.

BACKGROUND OF INVENTION

1. Field of Invention

The invention is directed to the quantitative determination of sediment physical properties of the seabed and the layered subbottom using single-channel seismic-reflection profiling data.

2. Discussion of Related Art

The seismic-reflection profiling method using normal-incidence single-channel acoustic systems is widely used in marine surveys to provide a qualitative overview of the large-scale geological features within the upper ~50-80 meters below the seafloor. The typical presentation of the seismic data in this case is a seismic section consisting of a large number of adjacent seismic traces, i.e., time series, for which amplitude is plotted versus two-way traveltime. Apart from this nearly exclusive application, seismic profiling has a potential of being used for the characterisation of the seabed sediments and the layered subbottom structure. The translation of traveltime into depth and, therefore, layer thickness, however, requires the knowledge of the acoustic properties—sound velocity and attenuation—of the sediments. While attenuation can be determined from traveltime and frequency content of the seismic pulse and the reflections, sound velocity can not uniquely be determined from single-channel seismograms without further knowledge. This further knowledge can be provided by a physically sound model conception that describes mathematically the quantitative relationships between acoustic properties and material properties of the seabed sediments.

1.2. Existing Theory and Previous Approaches

The most comprehensive existing mathematical/physical model to calculate the acoustic properties of a porous medium from the geometrical and elastic properties of its constituents and its structure, the frame, was formulated by Biot (1956a, b) (Biot, M. A. (1956a) "Theory of propagation of elastic waves in a fluid saturated porous solid, I. lower frequency range," *J. Acoust. Soc. Am.,* 28, 168-178) and (Biot, M. A. (1956b) "Theory of propagation of elastic waves in a fluid saturated porous solid, II. Higher frequency range," *J. Acoust. Soc. Am.,* 28, 179-191). This theory allows the calculation of velocity and attenuation of compressional- and shear waves of a fluid-filled porous solid from a set of sediment physical parameters:

Solid phase bulk density, $\rho_r$,
Solid phase bulk modulus, $K_r$,
Pore fluid density, $\rho_f$,
Pore fluid bulk modulus, $K_f$,
Pore fluid viscosity, $\eta$,
Frame bulk modulus, $K_b$,
Frame shear modulus, $G_b$,
Porosity, $\phi$,
Permeability, $\kappa$,
Pore size, d,
Tortuosity, a.

In the frequency domain, velocity, $V_P$, and attenuation, $Q_P^{-1}$, of the compressional waves are given by $$V_P = \frac{\omega}{\Re(k)}, \quad \frac{1}{Q_P} = \frac{2\Im(k)V_P}{\pi\omega}, \quad (1)$$

where $\omega$ is angular frequency, $\Re(k)$ and $\Im(k)$ are real and imaginary parts of the complex wave number k which is calculated from the characteristic equation $$\begin{vmatrix} Hk^2 - \rho\omega^2 & \rho_f\omega^2 - Ck^2 \\ Ck^2 - \rho_f\omega^2 & m\omega^2 - Mk^2 - \frac{i\omega F\eta}{\kappa} \end{vmatrix} = 0, \quad (2)$$

where $m=a\rho_f/\phi$, $\rho$ is the density of the saturated porous medium, F is a correction factor for flow at high frequencies, i is the imaginary unit, and $$H = \frac{(K_r - K_b)^2}{D - K_b} + K_b + \frac{4}{3}G_b, \quad (3)$$

$$C = \frac{K_r(K_r - K_b)}{D - K_b},$$

$$M = \frac{K_r^2}{D - K_b},$$

$$D = K_r\left(1 + \phi\left(\frac{K_r}{K_f} - 1\right)\right).$$

This model, which in its original formulation is applicable to solid porous media only, has been adapted to unconsolidated marine sediments (Stoll, R. D. (1974) "Acoustic waves in saturated sediments," in: Physics of sound in marine sediments, L. Hampton (ed.), New York: Plenum Press) by introducing the concept of an inelastic frame to replace the solid elastic frame. This inelastic frame is supposed to account for the fact that the solid phase in such an unconsolidated material occurs in a loosely-packed granular aggregate, a state that (1) shows a greatly reduced rigidity in contrast to the frame of a solid material and (2) absorbs energy of a passing sound wave. In this model, known as the Biot-Stoll model, the inelastic sediment frame is accounted for by constant complex bulk and shear frame moduli, $K_b$ and $G_b$, respectively, that are assumed to describe a postulated grain-to-grain friction occurring at the grain contacts when an acoustic wave passes through the sediment. The two corresponding additional input parameters introduced by the Biot-Stoll model are the imaginary parts of the frame bulk and shear moduli. These are assumed according to empirical data (e.g., Hamilton, E. L. (1972) "Compressional wave attenuation in marine sediments," *Geophysics,* 37, 620-646).

This concept of an inelastic sediment frame is physically problematic, because with the postulation of grain-to-grain friction, a non-linear component is added to the linear original Biot theory. This leads to a dependence on the magnitude of the particle displacements (Winkler, K., Nur, A., and Gladwin, M. (1978) "Friction and seismic attenuation in rocks," *Nature,* 277, 528-531) of the wave attenuation which is not accounted for in the Biot-Stoll model. Moreover, the Biot-Stoll model does not allow for these complex bulk and shear frame moduli to be calculated from material properties but adjusts these moduli to fit literature data on sound attenuation in coarse-grained unconsolidated marine sediments such as sands. In addition, the Biot-Stoll model relies on empirical values for sound attenuation and lacks, therefore, mathematical rigour in the prediction of the acoustic properties of an arbitrary individual marine sediment. For fine-grained unconsolidated marine sediments such as clay, a further modification Stoll (Stoll, R. D. (1989) "Sediment Acoustics," in: Bhattacharji, S, Friedman, G. M., Neugebauer, H. J., and Seilacher, A. (Eds.) Lecture Notes in Earth Sciences, Vol. 26, New York: Springer) to accommodate a fit with data introduces a viscoelastic component to the constant complex frame moduli. In spite of its partly empirical and heuristic nature, the Biot-Stoll model is widely used in modeling unconsolidated marine sediments (e.g., Turgut, A., and Yamamoto, T. (1988) "Synthetic seismograms for marine sediments and determination of porosity and permeability," *Geophysics*, 53, 1056-1067); Holland, C. W., and Brunson, B. A. (1988) "The Biot-Stoll model: and experimental assessment," *J. Acoust. Soc. Am.*, 84, 1437-1443; and Turgut, A. (2000) "Approximate expressions for viscous attenuation in marine sediments: Relating Biot's "critical" and "peak" frequencies," *J. Acoust. Soc. Am.*, 108, 513-518). U.S. Pat. No. 5,815, 465 (Sep. 29, 1998, Method and apparatus of classifying marine sediment (Altan Turgut) discloses a method to determine sediment parameters from acoustic measurements, in which Biot's equations are used in connection with constant complex elastic moduli of the sediment frame. This is an indication that actually the Biot-Stoll model is used therein, because in the original Biot theory the elastic moduli are real parameters.

SUMMARY OF INVENTION

Accordingly, the present invention provides a method for the quantitative characterization of a seabed sediment composition and a seabed's layered subbottom structure from at least one normal-incidence, single-channel reflection acoustic amplitude time series seismogram, method of generating a synthetic seismogram, a forward model describing the physical relationships between the material properties and the acoustic properties of seabed sediments, and the use of such a mathematical model in an inversion scheme, as set out in the appended claims.

According to a first aspect of the invention there is provided a method for the quantitative characterization of a seabed sediment composition and a seabed's layered subbottom structure from at least one normal-incidence, single-channel reflection acoustic amplitude time series seismogram, the method comprising the steps of:

detecting a plurality of reflections from subbottom interfaces in said seismograms;

determining the traveltime, the polarity and the reflectivity of each detected reflection;

determining the intrinsic attenuation of the sediment layer between pairs of adjacent reflections;

determining the acoustic properties, layer thicknesses and material properties of the seabed's layered subbottom structure as a function of said traveltimes, polarities and reflectivities of the detected reflections and said intrinsic attenuation of the sediment layer between pairs of adjacent reflections.

According to an embodiment, the step of determining traveltimes comprises using an estimation of the source wavelet, deformed according to a pre-defined set of attenuation values, in a cross-correlation process with the respective seismogram.

According to an embodiment, the step of determining the intrinsic attenuation comprises using an estimation of the source wavelet, deformed according to a pre-defined set of attenuation values, in a cross-correlation process with the respective seismogram.

According to an embodiment, the step of determining the reflectivity of each detected reflection comprises determining the maxima of the respective envelope of each reflection, although it will be appreciated that alternative known methods may be used.

According to an embodiment, the step of determining the acoustic properties, layer thicknesses and material properties of the seabed's layered subbottom structure as a function of said traveltimes, polarities and reflectivities of the detected reflections and said intrinsic attenuation of the sediment layer between pairs of adjacent reflections, comprises the development of a forward model describing the physical relationships between the material properties and the acoustic properties of said seabed sediments.

An embodiment of the forward model comprises:

a quantitative model of the fine-structure of the clay fraction within said sediment and of the mechanical response resulting from the specifications of said fine-structure, and a quantitative model of the overall structure of said sediment's frame and of the mechanical response resulting from the specifications of said overall structure.

According to a second aspect of the invention there is provided a method of generating a synthetic seismogram from a pre-defined layered structure of unconsolidated sediments whose material properties are described by a set of parameters, comprising the steps of:

developing a forward model describing the physical relationships between the material properties and the acoustic properties of said seabed sediments, said forward model comprising:

a quantitative model of the fine-structure of the clay fraction within said sediment and of the mechanical response resulting from the specifications of said fine-structure, and a quantitative model of the overall structure of said sediment's frame and of the mechanical response resulting from the specifications of said overall structure; and inputting said set of material property parameters into said forward model to derive a synthetic seismogram.

According to an embodiment, the forward model considers each grain of said sediment as spherical in shape. Preferably the forward model replaces the actual grain-size distribution of said sediment by two grain sizes. Preferably the size ratio of the two grain sizes is of the order of about 100. Preferably the forward model considers the packings of the two grain sizes independently.

According to an embodiment, the forward model considers the material of the smaller grain fraction as an anelastic two-phase system, consisting of an elastic matrix interspersed with fluid-filled low-aspect ratio ellipsoidal inclusions, representing interlayer water in expandable clay minerals, that are connected with the pore space of the overall structure along their complete peripheries.

According to an embodiment, the forward model considers the shear modulus of the larger grains to be elastic and the shear modulus of the smaller grains to be complex and frequency-dependent.

According to an embodiment, the forward model considers complex and frequency-dependent shear modulus of said smaller grains as being a consequence of the stress-induced squirt-flow from the low-aspect ratio inclusions in the smaller-grain fraction into the pore space of the overall structure of the sediment frame.

According to an embodiment, the forward model quantitatively describes stress-induced radial squirt-flow processes, in the immediate contact region between the sediment grains within the overall structure of the sediment frame, as a function of effective pressure (difference between confining pressure and pore pressure).

According to an embodiment, the bulk and shear moduli of the overall structure of the sediment frame are complex and frequency-dependent.

According to an embodiment, the complex and frequency-dependent bulk and shear moduli of the overall structure of the sediment frame are considered a consequence of both the said squirt-flow from the low-aspect ratio inclusions in the small-grain fraction and the said radial squirt-flow processes in the immediate vicinity of the grain contacts.

According to an embodiment, the forward model considers the dependence on depth below the seafloor of all pressure-dependent parameters.

According to an embodiment, the forward model provides a quantitative relationship between porosity and effective pressure over the whole range of depths below the seafloor.

According to an embodiment, the forward model provides a quantitative relationship between porosity and composition.

According to an embodiment, the set of material property parameters comprises only:
 a. seawater density,
 b. seawater bulk modulus,
 c. seawater viscosity,
 d. thicknesses of sediment layers, and for each layer
 e. volume content of carbonates,
 f. volume content of small grain-materials, and
 g. volume content of expandable clay minerals.

According to a further aspect of the invention there is provided the use of a mathematical model generated using the method described hereinabove in an inversion scheme whose input parameters are said traveltimes, polarities and reflectivities of the detected reflections and said intrinsic attenuation of the sediment layer between pairs of adjacent reflections, to determine the acoustic properties, layer thicknesses and material properties of a seabed's layered subbottom structure.

The invention further provides a forward model describing the physical relationships between the material properties and the acoustic properties of seabed sediments, comprising:
 a quantitative model of the fine-structure of the clay fraction within said sediment and of the mechanical response resulting from the specifications of said fine-structure, and
 a quantitative model of the overall structure of said sediment's frame and of the mechanical response resulting from the specifications of said overall structure.

According to an embodiment, each grain of said sediment is considered spherical in shape. Preferably the actual grain-size distribution of each sediment is replaced by two grain sizes. Preferably the size ratio of the two grain sizes is of the order of about 100. Preferably the packings of the two grain sizes are considered independently.

According to an embodiment, the material of the smaller grain fraction is considered as an anelastic two-phase system, consisting of an elastic matrix interspersed with fluid-filled low-aspect ratio ellipsoidal inclusions, representing interlayer water in expandable clay minerals, that are connected with the pore space of the overall structure along their complete peripheries.

According to an embodiment, the shear modulus of the larger grains is considered elastic and the shear modulus of the smaller grains is considered complex and frequency-dependent.

According to an embodiment, complex and frequency-dependent shear modulus of said smaller grains are considered as a consequence of the stress-induced squirt-flow from the low-aspect ratio inclusions in the smaller-grain fraction into the pore space of the overall structure of the sediment frame.

According to an embodiment, stress-induced radial squirt-flow processes, in the immediate contact region between the sediment grains within the overall structure of the sediment frame, are quantitatively described as a function of effective pressure (difference between confining pressure and pore pressure).

According to an embodiment, bulk and shear moduli of the overall structure of the sediment frame are complex and frequency-dependent.

According to an embodiment, said complex and frequency-dependent bulk and shear moduli of the overall structure of the sediment frame are considered a consequence of both the said squirt-flow from the low-aspect ratio inclusions in the small-grain fraction and the said radial squirt-flow processes in the immediate vicinity of the grain contacts.

According to an embodiment, the dependence on depth below the seafloor of all pressure-dependent parameters is considered.

According to an embodiment, a quantitative relationship between porosity and effective pressure over the whole range of depths below the seafloor is provided.

According to an embodiment, a quantitative relationship between porosity and composition is provided.

In one embodiment of the invention, a series of seismograms are used for the quantitative characterization of a seabed sediment composition and a seabed's layered subbottom structure across an area of the seabed.

The invention further provides a computer readable medium having instructions which, when executed by a processor, cause the processor to perform any of the methods described hereinabove.

BRIEF DESCRIPTION OF DRAWINGS

FIG. 4 is a schematic of a combination of two identical elastic spheres of radius R with contact water distributed in a pendular ring of outer radius b and outer thickness d around the direct sphere-to sphere contact of radius a;

DETAILED DESCRIPTION

Figure 1:
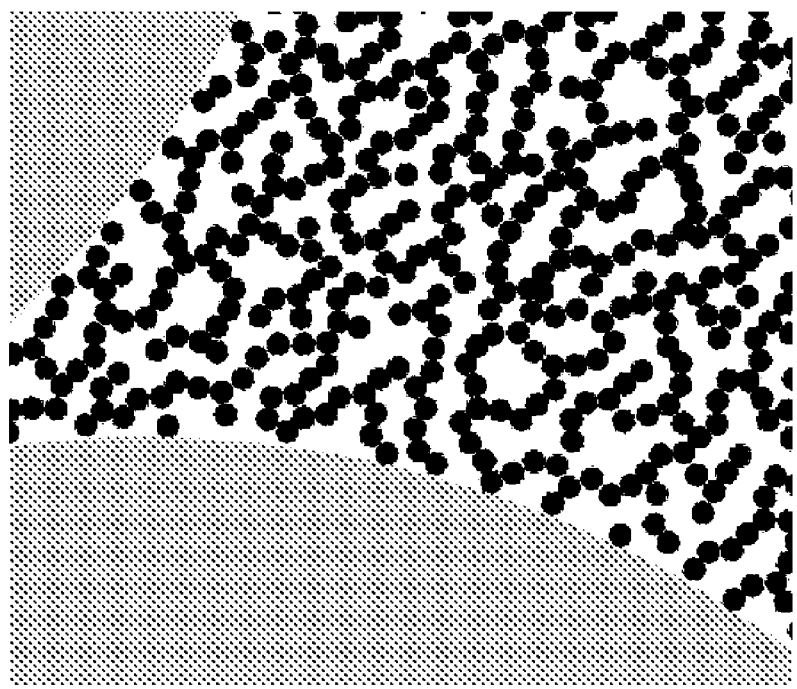
FIG. 1 is a schematic of the model conception of a bimodal grain-size sphere pack. Radii of the particles differ by two orders of magnitude.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

It will be appreciated that the invention provides an improved model for sediment acoustics.

U.S. Pat. No. 6,061,300 (May 9, 2000, Method of imaging the permeability and fluid content structure within sediment (Tokuo Yamamoto) uses a model by Dvorkin and Nur (Dvorkin, J. and Nur, A. (1993) "Dynamic poroelasticity: A unified model with the squirt and the Biot mechanisms," *Geophysics,* 58, 524-533) that has been formulated for solid sandstones. The present invention is an improved adaptation of the original Biot theory to unconsolidated marine sediment. This formulation is characterised by a higher degree in mathematical rigour in the prediction of the acoustic properties of unconsolidated marine sediments than the previously used Biot-Stoll model. This is achieved by a geometrical model and a mechanical model with two components that explicitly describe the dominant physical processes activated by and affecting the propagation of sound waves travelling through soft sediment. These are generally known as local fluid flow ('squirt flow'). The occurrence in unconsolidated sediment of processes of this kind had been postulated earlier by Stoll (Stoll, R. D. (1985) "Marine sediment acoustics," *J. Acoust. Soc. Am.,* 77, 1789-1799) without proposing a mathematical description on the basis of a geometrical model.

The three components of the improved sediment model of the present invention are:

a) Standard model of marine unconsolidated sediment—This model replaces the actual grain-size distribution of a given sediment by two grain sizes, one representing sand and coarse silt and the other representing clay and fine silt, and considers the grain shapes as spherical. This approach allows the calculation of many input parameters such as porosity (see section 2.2), grain density (see section 2.3), permeability, pore size and tortuosity from sediment composition in terms of small-grain and large-grain volume fraction and quoted material properties. Therefore, it allows the reduction of the set of input parameters.

b) Effective-grain model—This model (Leurer, K. C. (1997) "Attenuation in fine-grained marine sediments: extension of the Biot-Stoll model by the "effective grain model" (EGM), *Geophysics,* 62, 1465-1479) accounts for the fact that a particular species of sediment grains, i.e., expandable clay minerals known as montmorillonite that are present in the clay fraction of marine sediments at variable amounts, actually consist of the mineral phase and adsorbed water in alternating layers. The resulting two-phase nature of this mineral species leads to a decrease in the resistance on mechanical deformation, which in turn strongly influences the propagation of a passing acoustic wave. The original model yields the grain bulk modulus (see section 2.4) whereas the extended formulation given below also yields the grain shear modulus.

c) Viscoelastic contact model—The most significant improvement regarding the previous models is a viscoelastic formulation that quantitatively describes squirt-flow processes in the immediate contact region between the grains. These are activated by a sound wave travelling through the sediment and, in turn, these affect the propagation behaviour of the wave. This model yields the frame bulk and shear moduli (see section 2.5).

Both model components in b) and c) are linear models with physically reasonable assumptions and can therefore be included in the original Biot theory without further mathematical development (Biot, M. A. (1962), "Mechanics of deformation and acoustic propagation in porous media," *J. Appl. Physics,* 33, 1482-1498). In addition, in the new formulation the dependence on depth below the seafloor of all pressure-dependent parameters is included. This is not part of either the original Biot theory or the Biot-Stoll model. The reduced set of input parameters comprises, apart from quoted values for density and elastic moduli of the solid constituents, Seawater density, $\rho_f$,
Seawater bulk modulus, $K_f$,
Seawater viscosity, $\eta$,
Thickness of sediment layer, e, (alternatively: effective pressure)
Volume content of carbonates, $c_{carb}$,
Volume content of small-grain material, $c_{clay}$,
Volume content of expandable clay minerals, $c_{mont}$.

These three components have allowed the construction of a new forward model that (1) allows the generation of synthetic seismograms from a pre-defined layered structure of sediments whose material properties are described by the reduced set of parameters and (2) can be used in an inversion procedure to determine acoustic parameters, layer thicknesses and material properties of sediments from measured normal-incidence single-channel seismograms.

1. Standard Sediment Model

The present invention uses the concept of a standard characterisation of marine sediment. This standard is considered as comprising the physical characteristics that have the most significant effect on the propagation of acoustic waves through marine sediments whereas the remaining characteristics are considered as negligible with respect to the propagation of sound waves. The geometrical specifications of this model greatly reduce the input parameters. A similar approach taken by Marion et al. (Marion, D., Nur, A., Yin, H., and Han, D. (1992) "Compressional velocity and porosity in sand-clay mixtures," *Geophysics,* 57, 554-563) and Dvorkin and Gutierrez (Dvorkin, J. and M. A. Gutierrez (2001) "Textural sorting effect on elastic velocities, part II: Elasticity of a bimodal grain mixture," $71^{st}$ *SEG Annual Meeting, San Antonio, Expanded Abstracts,* 1764-1767) lacks the explicit particulate formulation, i.e., the mathematical formulation of the grain-contact mechanics and their consequences for the propagation of the acoustic waves; moreover, while the former authors do not provide at all a quantitative relationship between porosity and confining pressure, the latter propose a heuristic one that can be considered valid only in clay-bearing sandstones and sands that are already highly compacted, but not over the whole range of depths below the seafloor.

2.1 Standardisation

The standardisation consists of a replacement of the generally continuous grain-size distribution of an arbitrary actual sediment by a bimodal grain-size distribution wherein the sediment grains are considered as spherical particles. The smaller particles represent the clay fraction and the finer part of the silt fraction whereas the larger particles represent the sand fraction and the coarser part of the silt fraction of a given sediment. The size ratio of the larger to smaller sediment grains is 100 (FIG. 1). This condition guarantees that the individual large- and small-sphere fractions do not significantly influence each other's packing and rearrangement in a compaction process. (This simplification of grain shape is analogous to the common practice of expressing grain-size through the diameter of an equivalent spherical particle having the same settling velocity as the actual—in the extreme even plate-shaped—particle.)

FIG. 1 is a schematic of the model conception of a bimodal grain-size sphere pack. Radii of the particles differ by two orders of magnitude (grey areas: sections of the large grains; black: small grains).

The most important sediment physical parameters for use in the standard sediment model of the invention are porosity, grain density and saturated density, bulk and shear moduli of the grain material, and the frame bulk and shear moduli of the sediment. These are described in the following sections.

2.2 Porosity

Porosity Limits

In a real uncompacted marine clay, the maximum porosity can be assumed as $\phi=0.9$ (e.g., Buckingham, M. J. (1997) "Theory of acoustic attenuation, dispersion, and pulse propagation in unconsolidated granular materials including marine sediments," *J. Acoust. Soc. Am.*, 102, 2579-2596), a value of $\phi=0.93$ having been reported by McLeroy and DeLoach (1968) (McLeroy and DeLoach (1968) "Sound speed and attenuation, from 15 to 1500 kHz, measured in natural seafloor sediments," *J. Acoust. Soc. Am.*, 44, 1148-1150). This maximum porosity of clay is considered as the high-porosity limit of the small-sphere pack in the geometrical model presented here. The highest possible effective porosity in the bimodal mixture is therefore realized when the volume content of large spheres is zero.

Porosity of a Bimodal Grain Mixture at the Seafloor (z=0)

The whole range of uncompacted seafloor sediments towards lower porosities can be visualized in this model by adding increasing amounts of the large-sphere material to the mixture. This gradually reduces the effective porosity, simply because a corresponding volume fraction in the sediment is increasingly occupied by a solid, while the porosity of the small-particle aggregate between the larger spheres remains constant. This can be continued until the uncompacted low-porosity limit of seafloor sediment is reached, which is determined, in terms of this model, by the loosest possible packing of the large spheres whose pore space is filled with the highest-porosity small-grain packing. Small-particle concentrations as low as to form suspensions are not considered.

Porosity of a Bimodal Grain Mixture Under Compaction (z>0)

Mechanical compaction is associated with a rearrangement of the sediment particles leading to a gradually closer packing. In this model, the state of highest compaction considered in each individual sphere pack is determined by the densest possible packing of an aggregate of identical spheres, where the porosity assumes a value of about $\phi=0.35$.

Consequently, the lowest possible porosity in a bimodal mixture corresponds to the state of highest compaction in both individual fractions, i.e., when the interstices of the densest large-sphere packing are occupied by the densest small-sphere packing. This critical stage is very important as it separates two distinct domains, in which the porosity increases towards its value in a random dense pack of identical spheres as the composition changes. In the domain towards higher concentrations of the small spheres than at this critical stage, the highest compaction is characterized by the densest packing of the fine-grained material. The packing of the larger spheres, however, becomes gradually less dense, so that volume fractions previously occupied by solid large spheres are increasingly replaced by—porous—fine-grained material until the pure dense small-sphere pack is reached. Towards lower concentrations of fine-grained material than at the critical stage, the highest compaction is characterized by the densest packing of the coarse-grained material, whose interstices are filled with gradually less densely packed fine-grained material. In this domain, the packing of the dominating large spheres prevents a complete compaction of the small spheres. In the following, these domains are called the sand domain and the clay domain, respectively.

Using these assumptions and the considerations concerning the limits of porosity in our model, the effective porosity of an uncompacted binary particle-size mixture, expressed as a function of the small-sphere fractional volume content $c_s$ within the total solid fraction, can be written as $$\phi_0(c_s) = \frac{\phi_{max} c_s}{1 - \phi_{max}(1 - c_s)}, \text{ for } c_s \geq 1 - \phi_{max}, \quad (4)$$

Wherein $\phi_{max}$ is the high-porosity limit of the small-sphere pack. At the depth of maximum compaction, the above-mentioned minimum possible effective porosity is given by $$\phi_{min} = \phi_{RD}^2, \quad (5)$$

Where $\phi_{RD}$ is the porosity of the random dense pack of identical spheres which has the same value in the large and the small sphere pack. This minimum porosity is reached when the small-sphere volume content $c_s$ within the solid phase assumes the critical value $$c_{s,crit} = \frac{\phi_{RD}}{1 + \phi_{RD}}. \quad (6)$$

In the sand domain, i.e., for lower small-sphere contents than $c_{s,crit}$, the high-compaction effective porosity limit is given by $$\phi_1(c_s) = \frac{\phi_{RD} - c_s}{1 - c_s}, 1 - \phi_{max} \leq c_s < c_{s,crit}, \quad (7)$$

whereas in the clay domain this porosity limit is given by $$\phi_1(c_s) = \frac{\phi_{RD} c_s}{1 - \phi_{RD}(1 - c_s)}, c_s > c_{s,crit}. \quad (8)$$

Based on comparison with boxcore data (Holler, P., and Kassens, H. (1989) Sedimentphysikalische Eigenschaften aus dem Europäischen Nordmeer (Datenreport F. S. Meteor, Reise 7). Ber. Sonderforschungsbereich 313, University of Kiel, 15, 1-61) and data from compaction experiments (Leurer, K. C. (2004) "Compressional and shear-wave velocities and attenuation in deep-sea sediment during laboratory compaction," *J. Acoust. Soc. Am.*, 116, 2023-2030), a logarithmic porosity variation with depth is assumed. Then, the resulting effective porosity of any given binary mixture can be expressed as a function of fine-grained content and depth according to $$\phi(c_s, z) = \phi_0(c_s) - [\phi_0(c_s) - \phi_1(c_s)]\frac{\ln(z/z_0)}{\ln(z_1/z_0)}, \quad (9)$$

where z is depth, $z_0$ and $z_1$ are the depth values that correspond to the limits of effective porosity, and where the appropriate porosity limit $\phi_1(c_s)$ for the sand or the clay domain (Eqs. (7) and (8), respectively) has to be substituted. The variation of porosity $\phi_s$ with depth in the small-sphere pack can be calculated from $$\phi_s(c_s, z) = \phi_{max} - \left[\phi_{max} - \frac{\phi_1(c_s)}{\phi_{RD}}\right]\frac{\ln(z/z_0)}{\ln(z_1/z_0)}, \quad (10)$$
$$1 - \phi_{max} < c_s < c_{s,crit},$$
and $$\phi_s(z) = \phi_{max} - [\phi_{max} - \phi_{RD}]\frac{\ln(z/z_0)}{\ln(z_1/z_0)}, \quad c_s \geq c_{s,crit}. \quad (11)$$

Equation (10) shows that, in the sand domain, the packing of the small-sphere component and, therefore, its porosity is dependent on the volume content $c_s$ of small spheres within the solid phase. The reason for this behavior is that in this range the mechanical rearrangement of the large spheres is never so pronounced as to allow the forming of the densest possible small-sphere pack in their interstices. The actual small-sphere pack porosity is therefore inversely proportional to $c_s$.

This situation changes, when the critical volume content $c_{s,crit}$ is reached. At this stage and at increasing values for $c_s$ in the clay domain (Eq. (11)), the compaction of the small-sphere pack is not limited by the packing of the larger spheres and exhibits the whole range of porosity variation from maximum small-sphere porosity $\phi_{max}$ at $z_0$ to the porosity value $\phi_{RD}$ of a random dense pack of spheres at $z_1$. In this domain, it is the large spheres that have increasingly less nearest-neighbor contacts towards higher small-sphere concentrations. The individual porosity $\phi_l$ of the large-sphere pack—throughout the whole range of volume content $c_s$ and of depth z—is given by $$\phi_l = \frac{\phi}{\phi_s}, \quad (12)$$

where the appropriate expression for $\phi_s$ in the sand domain, Eq. (10), or clay domain, Eq. (11), respectively, has to be substituted.

Model Porosity Versus Measured Porosity

To examine the validity of the bimodal standard sediment model, a comparison of the porosity following from the model to data sets on marine soft sediment is shown in this section. In addition, the data serve as a means to calibrate the model with respect to where to divide the measured continuous grain-size distribution into a large- and a small-particle component. In the calculations, the maximum porosity in the pure small-sphere pack is assumed to be 0.92 at depth $z_0=0.1$ m, which according to Eq. (4) leads to a minimum effective porosity of $\phi_0=0.49$ at $c_s=0.08$. Minimum porosity at the maximum depth of $z_1=2000$ m considered here is assumed to be 0.35 for both the individual large and small sphere dense packings. This leads to a minimum effective porosity of $\phi=0.1225$, according to Eq. (5), at a fine-grained volume fraction of $c_s=0.26$, according to Eq. (6).

The sample material originates from two box cores drawn in the Norwegian Sea and is well-described (Holler and Kassens (1989) "Sedimentphysikalische Eigenschaften aus dem Europäischen Nordmeer (Datenreport F. S. Meteor, Reise 7). Ber. Sonderforschungsbereich 313, University of Kiel, 15, 1-61; Leurer, K. C. (2004) "Compressional and shear-wave velocities and attenuation in deep-sea sediment during laboratory compaction," J. Acoust. Soc. Am., 116, 2023-2030)). The first example is a complete near-surface sediment column of 8.72 m length drawn at 74° 59.7' N. and 13° 58.2' E. from 1768 m water depth and the second one is a single sediment sample from a core drawn at 73° 03.8' N. and 09° 43.4' E. from 2227 m water depth. To convert the continuous grain-size distributions of the various sediment materials into the respective binary distribution, we applied a least-squares fit between measured and calculated porosity values. The best fit is observed when the small-grain component is defined as consisting of 84% of the clay and silt fraction and the remaining 16% of this fraction plus the sand fraction are defined as the large grain component.

Figure 2:
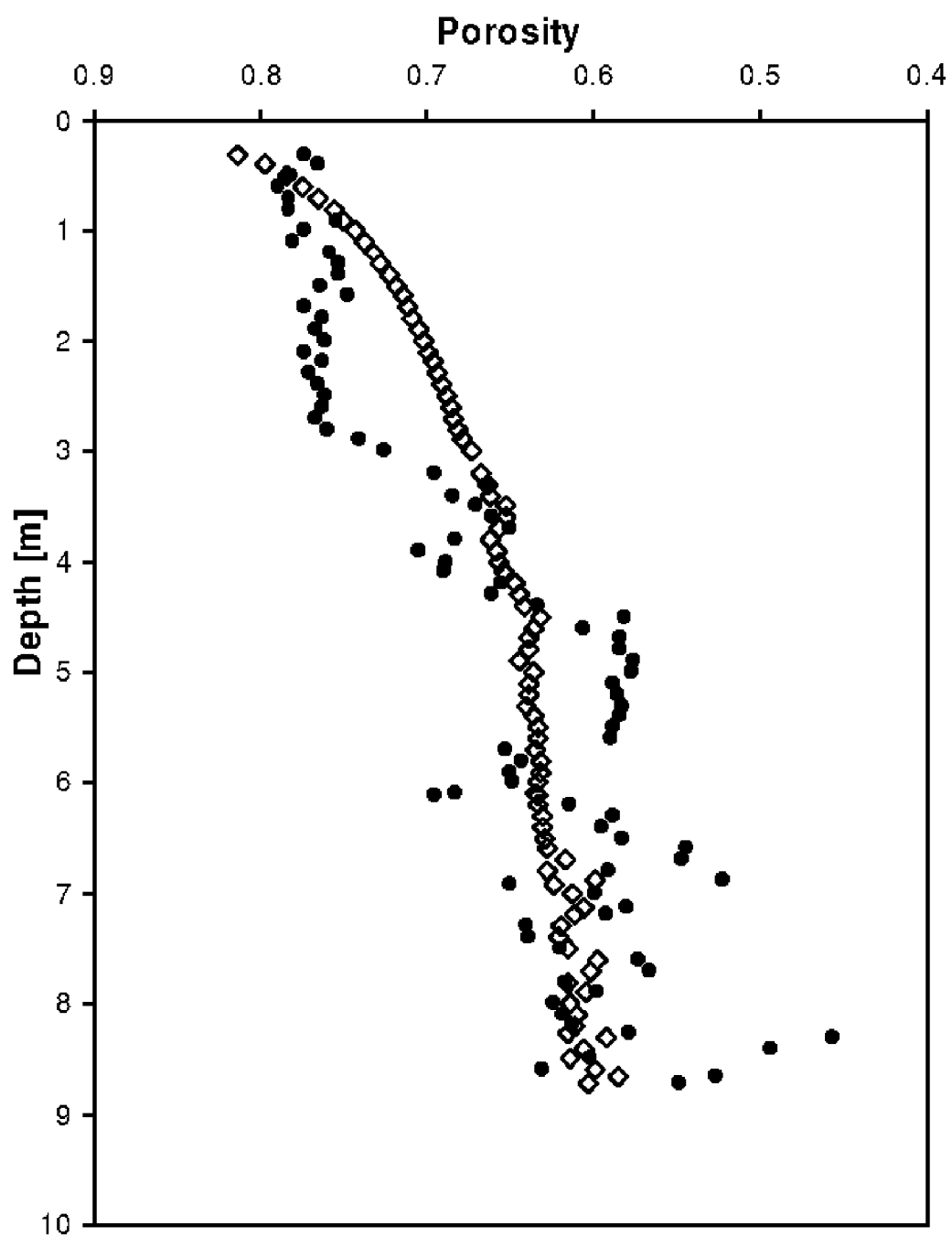
FIG. 2 shows a comparison of the effective porosity from our binary grain-size model with measured porosity values from a box core.

For the near-surface sediment core, the resulting porosity values from the bimodal grain-size model as a function of depth are shown in FIG. 2 together with the porosity values measured at the fresh core. The bimodal approach reflects the general trend in porosity decrease with depth in the near-surface domain. Note that each model porosity value results from applying Eq. (9) with the individual values $\phi_0$ and $\phi_1$ for the respective sediment material following from the core analysis data. The reasons for the deviations may include anomalous pore-pressure build-up in low-permeability sediments, interlocking of rough grains, poor sorting, i.e., processes that are impossible to predict but do not lead to intolerable differences between the model predictions and the data.

FIG. 2 shows a comparison of the effective porosity from our binary grain-size model (open symbols) with measured porosity values from a box core (solid symbols).

Figure 4:
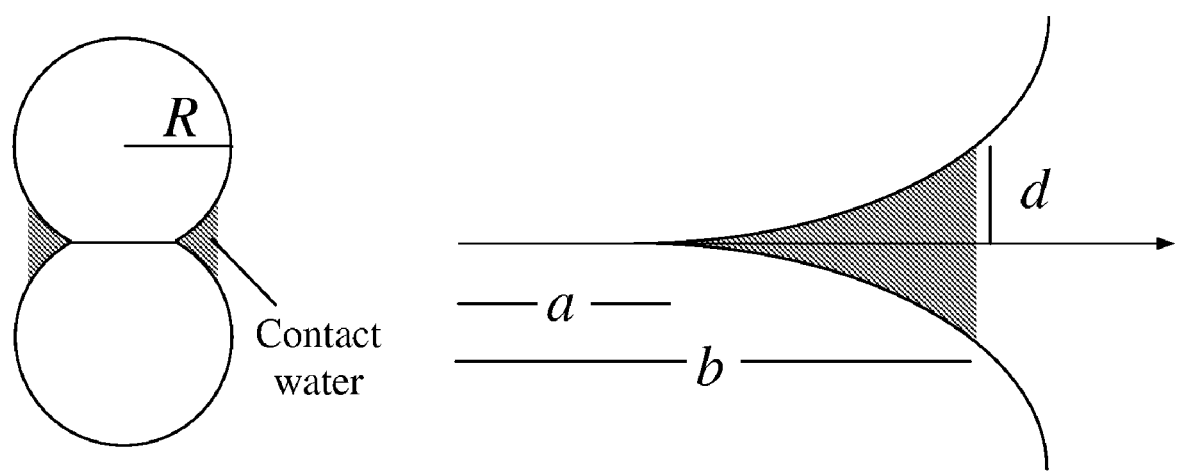

The single sediment sample has been used in a pulse transmission experiment (Leurer, K. C. (2004) "Compressional and shear-wave velocities and attenuation in deep-sea sediment during laboratory compaction," J. Acoust. Soc. Am. 116, 2023-2030) up to an effective pressure of 20 MPa, corresponding to a depth of approximately 2 km, and is therefore suitable to test the bimodal grain-size model in large-scale compaction. For this sediment sample, the composition of the clay fraction has been analyzed in addition to grain-size distribution. The comparison between calculated and measured porosity values from the compaction experiment is characterized by an excellent fit as shown in FIG. 4.

Figure 3:
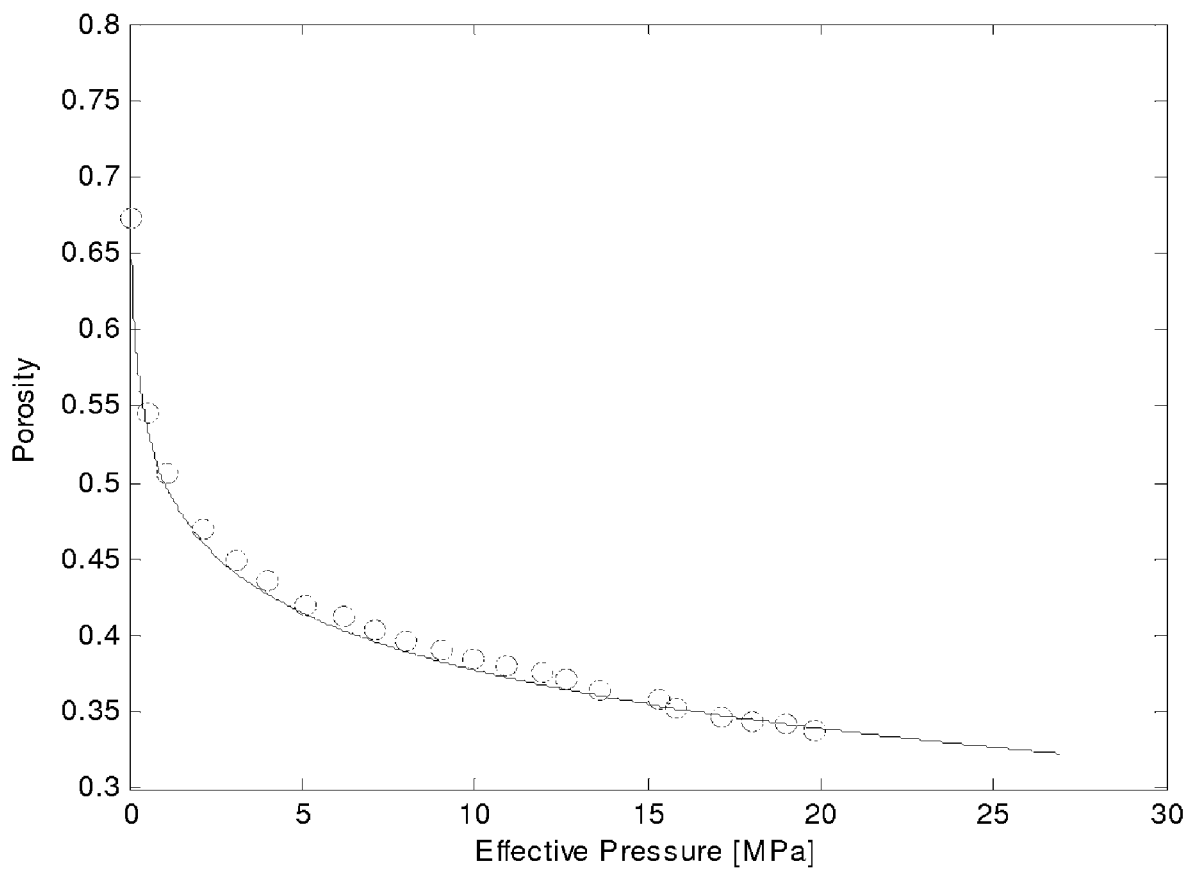
FIG. 3 shows a comparison of the effective porosity from standard sediment model with measured porosity values from a compaction experiment on a natural marine sediment sample as a function of effective pressure.

FIG. 3 shows a comparison of the effective porosity from standard sediment model (solid line) with measured porosity values (symbols) from a compaction experiment on a natural marine sediment sample as a function of effective pressure.

2.3 Grain Density and Wet Bulk Density

The generally different densities of (quartz-) sand and clay (in marine sediment mainly illite, chlorite, kaolinite, montmorillonite) are ascribed to the large- and the small-grain fraction, respectively, of the bimodal standard sediment. The carbonate particles are known to follow the entire grain-size distribution in a marine sediment; accordingly, they are evenly distributed in the model presented here. The grain densities of the large- and the small-grain fractions, respectively, are given by $$\rho_l = c_{carb}\rho_{carb} + c_{quartz}\rho_{quartz}, \qquad (13)$$

$$\rho_s = \frac{c_{carb}\rho_{carb} + c_{clay}\rho_{clay} + c_{mont}\rho_{mont} + c_{ads}\rho_{ads}}{1 + c_{ads}},$$

where c is the indicated volume fraction and p the density of carbonates, quartz, clay, montmorillonite and adsorbed interlayer water in the montmorillonite, respectively. The overall density of the composite grain material is given by $$\rho_g = c_s \rho_s + c_l \rho_l. \qquad (14)$$

From porosity and grain density, the wet bulk density or saturated density of the sediment is calculated by $$\rho = \phi\rho_f + (1-\phi)\rho_g. \qquad (15)$$

Compaction in unconsolidated marine sediment is dominated by a reduction in porosity, which in turn is caused by an increase with depth below the sea bottom of the effective pressure—the difference between overburden pressure and pore pressure—acting on the solid frame of the sediment. The average effective pressure $p_e$ in a sediment layer at depth n can be calculated recursively according to $$p_e|_n = g(\rho - \rho_f)z + p_e|_{n-1}. \qquad (16)$$

where g is the gravitational acceleration and $p_e|_{n-1}$ is the effective pressure of the layer package above the layer at consideration. Knowledge of the effective pressure is necessary for the calculation of the contact stiffness between the sediment grains in the viscoelastic contact model (see section 2.5).

2.4 Complex Frequency-dependent Grain Moduli—Effective-grain Model

The formulation of the effective-grain model (Leurer, K. C. (1997) "Attenuation in fine-grained marine sediments: extension of the Biot-Stoll model by the "effective grain model" (EGM), Geophysics, 62, 1465-1479) is based on the assumption that the description of the grain material by a constant real bulk modulus is not adequate if the sediment has a significant clay fraction and if expandable clay minerals (mainly represented by the montmorillonites) are present, the latter being the case in virtually all clay-bearing marine sediments. As a consequence of the swelling of the expandable clay minerals, i.e., the uptake of water layers between the mineral layers of the sheet-like montmorillonite crystallites, the entire clay fraction can be considered as a two-phase system.

In the effective-grain model, the water interlayers of the expanded montmorillonite are considered as flat ellipsoidal inclusions homogeneously and isotropically distributed throughout the elastic mineral phase of the small-grain fraction. The grain-material of the small-grain fraction is treated as an effective medium with an anelastic response to stress waves. The associated relaxation mechanism consists in the stress-induced motion of the interlayer water into the pore space and its delayed reentry into the interlayer space of the crystallite and can therefore be regarded as a 'squirt-flow' process (Mavko, G., and Nur, A. (1975) "Melt squirt in the asthenophere," *J. Geophys. Res.*, 80, 1444-1448). This process is described by complex frequency-dependent bulk and shear moduli, $K_g$ and $G_g$, respectively, of the grain material of the small-grain fraction that are given by $$\frac{K_g - K_r}{3K_g + 4G_r} = \frac{1}{3}\frac{K_{ads} - K_r}{3K_r + 4G_r}\sum_m c(\alpha_m)T_{iijj}(\alpha_m), \qquad (17)$$

for the bulk modulus, where $K_r$ and $G_r$ are the mineral bulk and shear moduli, C is volume concentration of the m-th aspect ratio $\alpha_m$ in a distribution of aspect ratios, so that $$c(\alpha_m) = \frac{\theta(\alpha_m)c_{mont}}{2^n}, \qquad (18)$$

where θ is the continuous distribution of aspect ratios subdivided in $2^n$ discrete classes. The distribution is chosen in such a way as to reflect the grain-size distribution of the montmorillonite. If the actual grain sizes of the montmorillonite are not available, an average grain-size distribution of several montmorillonite samples taken from Vogt and Köster (1978) yields $\theta(\alpha_m) \approx 0.45 + 0.046 \cdot \ln(\alpha_m)$. The parameter $T_{iijj}$ is a scalar element of a tensor formulated by Wu (1966) that is relevant for compressional loading in two-phase media, and $$K_{ads}(\omega) = K_{ads} + i\omega g \qquad (19)$$

$$g = \frac{3\eta}{2\alpha_m^2 K_{ads}}K_r,$$

and $$\frac{G_g - G_r}{6G_g(K_r + 2G_r) + G_r(9K_r + 8G_r)} = \qquad (20)$$

$$\frac{G_{ads} - G_r}{25G_r(3K_r + 4G_r)}\sum_m c(\alpha_m)\left[T_{ijij}(\alpha_m) - \frac{1}{3}T_{iijj}(\alpha_m)\right],$$

for the shear modulus, where $T_{ijij}$ is the corresponding tensor element (Wu (1966) "The effect of inclusion shape on the elastic moduli of a two-phase material," *International Journal of Solids and Structures*, 2, 1-8) for tangential loading, and $$G_{ads} = i\omega\eta, \qquad (21)$$

where η is the viscosity of the interlayer water.

2.5 Complex Frequency-dependent Frame Moduli—Viscoelastic Contact Model

The previous contact-model conceptions (Leurer and Dvorkin, 2000; 2006) (Leurer, K. C. and J. Dvorkin (2000) "Intergranular squirt flow in sand: grains with viscous cement," *International Journal of Solids and Structures*, 37, 1133-1144) and (Leurer, K. C. and J. Dvorkin (2006) "Viscoelasticity of unconsolidated sand with viscous cement," *Geophysics*, 71, in press.) assume the granular material to consist of identical elastic spheres and consider no dependence on pressure. The model presented here is a modification of the previous approach to accommodate the binary structure presented above and to include the effective-grain model. A general assumption is that the material properties of the constituents forming the grain material of the respective size class can be weighted according to the volume fractions of those constituents within their class. In the same way, the effective properties of the overall bimodal sphere pack will be weighted according to the volume fractions of small and large spheres. A further significant assumption is that the fraction of the pore water in the immediate vicinity of the grain contacts can be regarded as part of the solid frame, following Stoll (1985) (Stoll, R. D. (1985) "Marine sediment acoustics," *J. Acoust. Soc. Am.*, 77, 1789-1799), which thereby becomes a two-phase system. The binary structure is assumed to be macroscopically homogeneous and isotropic.

Frame Moduli of a Dry Sphere Pack

The traditional Hertz-Mindlin approach to obtain the bulk and shear moduli of a pack of spheres consists in finding the normal and tangential contact stiffnesses $S_n$ and $S_t$, respectively, of a single two-sphere combination, where stiffness is defined as the ratio of an applied normal or tangential force to the respectively resulting displacement of the spheres' centers with respect to the contact plane. These normal and tangential stiffnesses of a two-sphere combination can be used to calculate the frame bulk and shear moduli of a random pack of identical elastic spheres of porosity $\phi$ from (Walton (1987) "The effective elastic moduli of a random pack of spheres," *J. Mech. and Phys. Solids*, 35, 213-216).

$$K_b = \frac{N(1-\phi)}{12\pi R} S_n, \quad G_b = \frac{N(1-\phi)}{20\pi R}\left(S_n + \frac{3}{2}S_t\right), \quad (22)$$

wherein N is the number of contacts each sphere has with its nearest neighbors (coordination number) and R is the radius of the spheres. For the case of a dry sphere pack these moduli are can be regarded as the frame moduli. The stiffnesses are, according to Mindlin (1949) "Compliance of elastic bodies in contact," *J. Applied Mech.*, 16, 259-268), $$S_n = \frac{4aG}{1-v}, \quad S_t = \frac{8aG}{2-v}, \quad (23)$$

wherein G and v are the shear modulus and Poisson's ratio of the sphere material, respectively, and a is the radius of the circular contact plane forming between the compressed spheres. This contact radius is given by (Hertz, H. R. (1882) "Über die Berührung fester elastischer Körper," *Z. Reine Angew. Math.*, 92, 156-171)

$$a = \sqrt[3]{\frac{3F_H R(1-v)}{8G}}, \quad (24)$$

where $F_H$ is the Hertzian normal contact force between two grains that can be calculated from the effective pressure $p_e$ acting on a random pack of identical spheres from $$F_H = \frac{4\pi R^2 p_e}{N(1-\phi)}. \quad (25)$$

Complex Frame Moduli of a Wet Sphere Pack

Leurer and Dvorkin (Leurer, K. C. and J. Dvorkin (2000) "Intergranular squirt flow in sand: grains with viscous cement," *International Journal of Solids and Structures*, 37, 1133-1144) have shown that small amounts, viz. a few percent of the pore space, of viscous fluid at the grain contacts (FIG. 9) may significantly alter the normal contact stiffness of an uncompacted two-sphere combination.

For compacted spheres in a harmonic stress field, the fluid which is distributed in a pendular ring around the direct sphere-to-sphere contact, is forced to execute an oscillatory radial flow to restore the pressure equilibrium. This process leads to a frequency-dependent complex normal contact stiffness, while on the tangential stiffness it has only a minor influence that can be neglected. Leurer and Dvorkin (Leurer, K. C. and J. Dvorkin (2006) "Viscoelasticity of unconsolidated sand with viscous cement," *Geophysics*, 71, in press) have solved the governing integro-differential equation and have found a very accurate phenomenological approximation of the Cole-Cole form (Cole, K. S., and Cole, R. H. (1941) "Dispersion and absorption in dielectrics," *J. Chem. Phys.*, 9, 341-351) to their rigorous numerical solution for the complex normal contact stiffness whose real and imaginary parts can be written as $$\frac{\mathcal{R}(\hat{S})}{2\pi RK_w} = S_0 + (S_0 - S_\infty)\frac{1+(\omega\tau)^\beta \cos(\beta\pi/2)}{1+2(\omega\tau)^\beta \cos(\beta\pi/2)+(\omega\tau)^{2\beta}}, \quad (26)$$

$$\frac{\mathcal{I}(\hat{S})}{2\pi RK_w} = (S_\infty - S_0)\frac{(\omega\tau)^\beta \sin(\beta\pi/2)}{1+2(\omega\tau)^\beta \cos(\beta\pi/2)+(\omega\tau)^{2\beta}},$$

where $K_w$ is the bulk modulus of the fluid. Relaxationtime $\tau$ the distribution parameter $\beta$ have been found as $$\tau = [(2.7-0.33\cdot\ln(p_e/p_0))]\frac{\eta}{K_w\sigma^2}, \quad (27)$$

$$\beta = 0.12\cdot\ln(s_e)+0.92,$$

wherein $p_e$ and $p_0$ are effective and atmospheric pressure, respectively, $\eta$ is the viscosity of the contact water, and $\alpha$ is the ratio of outer thickness d to outer radius b of the space occupied by the contact water (FIG. 4). The relaxed and unrelaxed normal stiffnesses $S_0$ and $S_\infty$, respectively, with a being the dry direct sphere-to-sphere radius, are given by $$S_0 = \frac{S_n}{2\pi RK_w}, \quad S_\infty = S_0 + \tilde{A}\frac{b-a}{R}, \quad (28)$$

with $S_n$ from Eq. (23) and $$\tilde{A} = \tilde{B}\cdot\ln\left(\frac{K_w(1-v)}{G}\right)+\tilde{C}, \quad (29)$$

$$\tilde{B} = 0.11\cdot\ln(p_e/p_0)-2.1,$$

$$\tilde{C} = 0.050\cdot\ln(p_e/p_0)-1.5.$$

FIG. 4 is a schematic (contact geometry greatly exaggerated) of a combination of two identical elastic spheres of radius R with contact water distributed in a pendular ring of outer radius b and outer thickness d around the direct sphere-to sphere contact of radius a.

Using the complex normal contact stiffness $\hat{S}$ from eq. (26) and retaining the constant and real tangential contact stiffness $S_t$ from eq. (23), we arrive at the henceforth complex bulk and shear moduli of the two-phase skeletal frame of a random pack of identical spheres (cf. Eq. (22)), $$\hat{K}_{s,l} = \frac{N(1-\phi)}{12\pi R}\hat{S}, \quad \hat{G}_{s,l} = \frac{N(1-\phi)}{20\pi R}\left(\hat{S} + \frac{3}{2}S_t\right). \quad (30)$$

With the frame bulk and shear moduli having been determined in this manner separately for both grain-size fractions using their respective individual contact stiffnesses, coordination numbers, and partial porosities, the complex effective frame bulk and shear moduli of a binary sphere pack is calculated as the arithmetic mean of the isostrain (Voigt-) and the isostress (Reuss-) averages of the respective moduli according to (Mavko et al. (1998) "*The Rock Physics Handbook,*" Cambridge University Press)

$$\hat{K}_b = \frac{K_V + K_R}{2}, \quad \hat{G}_b = \frac{G_V + G_R}{2}. \quad (31)$$

wherein the Voigt averages of the bulk and shear moduli are $$K_V = c_s D_s \hat{S}_s + (1-c_s) D_l \hat{S}_l,$$

$$G_V = c_s E_s \tilde{S}_s + (1-c_s) E_l \tilde{S}_l, \quad (32)$$

and the respective Reuss averages are $$\frac{1}{K_R} = \frac{c_s}{D_s \hat{S}_s} + \frac{1-c_s}{D_l \hat{S}_l}, \quad (33)$$

$$\frac{1}{G_R} = \frac{c_s}{E_s \tilde{S}_s} + \frac{1-c_s}{E_l \tilde{S}_l},$$

with $$D_{s,l} = \frac{N_{s,l}(1-\phi_{s,l})}{12\pi R_{s,l}}, \quad E_{s,l} = \frac{N_{s,l}(1-\phi_{s,l})}{20\pi R_{s,l}}, \quad (34)$$

$$\tilde{S}_{s,l} = \left(\hat{S}_{s,l} + \frac{3}{2}S_{t,s,l}\right),$$

where the indices s and l denote the respective quantity for the small and for the large sphere pack.

Figure 5:
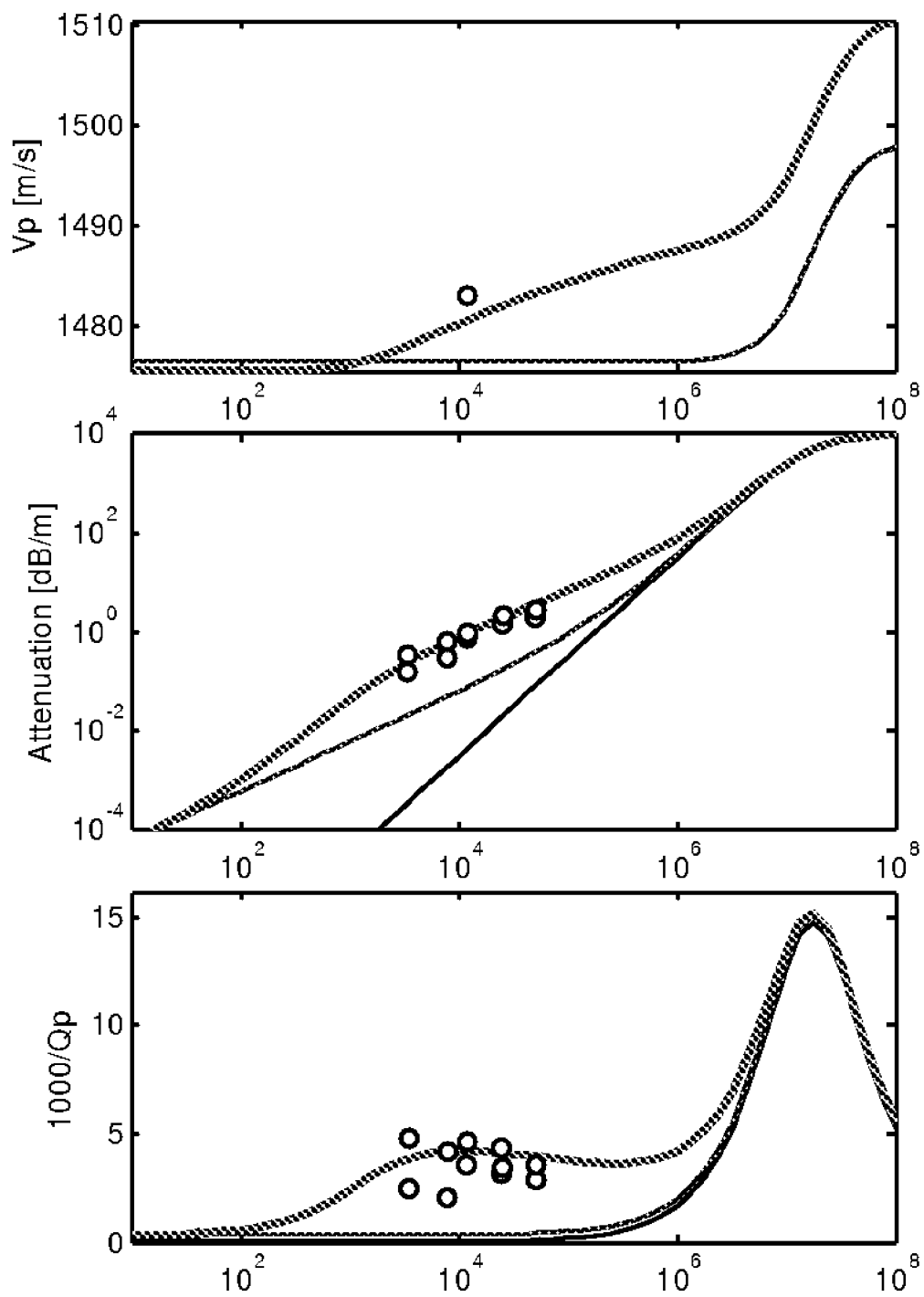
FIG. 5 is a comparison of compressional velocity, absorption coefficient, and attenuation.

To illustrate the improved adaptation to unconsolidated marine sediment of the original Biot theory by the new sediment model presented here, FIG. 5 shows the theoretical response (example: mud) as a function of frequency. A comparison to data from Wood and Weston (1964) shows an excellent fit with the standard sediment model, whereas the Biot-Stoll model and original Biot theory fail to explain the data.

FIG. 5 is a comparison of compressional velocity (top), absorption coefficient (middle), and attenuation (bottom) as calculated from the model presented here (red), original Biot theory (black) and Biot-Stoll model (blue) for marine mud data (black circles) by Wood and Weston (1964) "The propagation of sound in mud," *Acustica*, 14, 156-162.

3 Synthetic Seismograms

Figure 6:
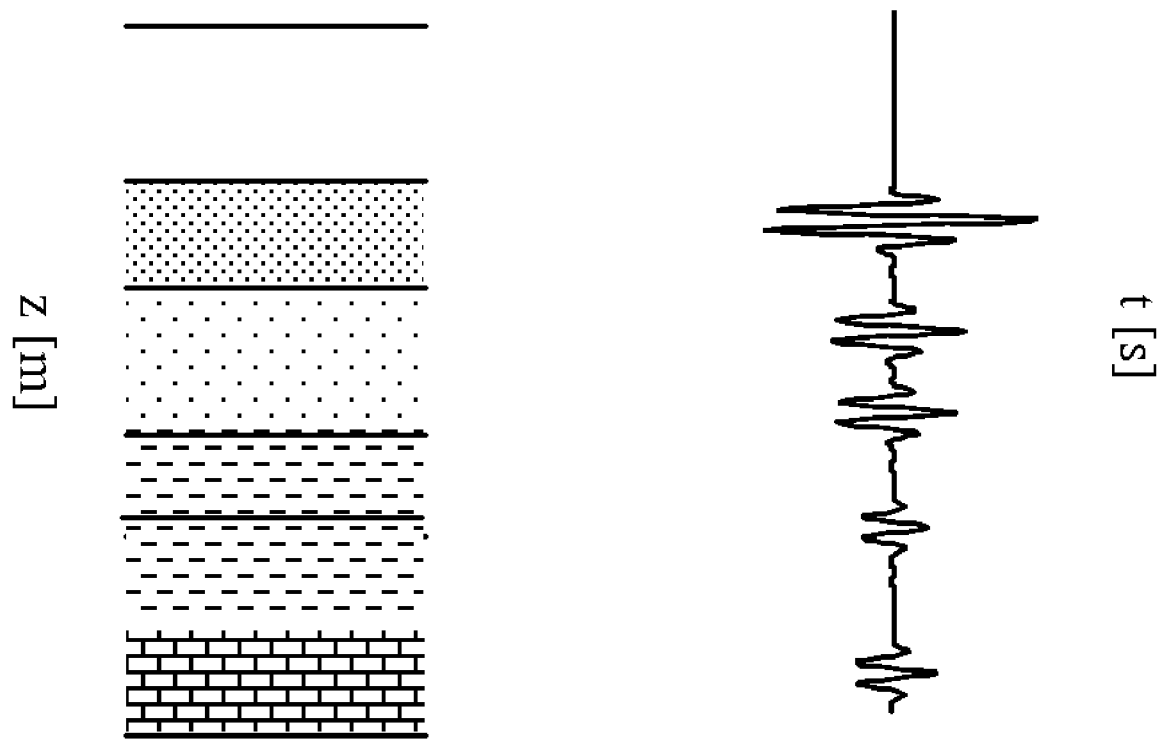
FIG. 6 shows an example for a synthetic seismogram.

The standard sediment model presented here can be used as a forward model to generate synthetic seismograms according to a pre-defined subbottom layered sediment structure for which the material properties Seawater density, $\rho_f$,
Seawater bulk modulus, $K_f$,
Seawater viscosity, $\eta$,
Thickness of sediment layer, e, (alternatively: effective pressure)
Volume content of carbonates, $c_{carb}$,
Volume content of small-grain material, $c_{clay}$,
Volume content of expandable clay minerals, $c_{mont}$.

are used as input parameters. Knowing the thickness of the sediment layers and the respective saturated densities (Eq. 15)) and using Eqs. (1), (2) amd (3) to calculate compressional velocity and attenuation, a synthetic seismogram can be calculated through the convolution of a known source wavelet with a series of spikes whose amplitudes correspond to the reflectivies of the sediment layers. An example for a synthetic seismogram is shown in FIG. 6. FIG. 6 shows from pre-defined sediment structure to synthetic seismogram.

4 Inversion of Seismic Reflection Data with Artificial Neural Networks

The forward model is the basic requirement for the prediction of sediment physical parameters from measured seismic reflection profiling data. The model presented here has been successfully applied in a preliminary test of a neural-network (NN) scheme for the inversion of seismic reflection data from Galway Bay.

The inversion of seismic reflection profiling data with NN requires the determination of several crucial parameters from the measured seismograms. These are the traveltimes of the reflections from the layer boundaries, the attenuation and the reflectivities. Traveltimes and attenuation are simultaneously determined by using an estimate of the source wavelet (based on the seabed reflection), deformed according to a pre-defined set of attenuation values, in a cross-correlation process (source-wavelet modelling) with the respective seismogram. The reflectivities, i.e., the reflection coefficients corrected for geometrical spreading, are determined from the maxima of the respective envelopes of the reflections (the absolute values of their Hilbert transforms).

NN-inversion requires a training procedure. The forward model is used to generate a multitude (~2000) synthetic seismograms using sediment parameters randomly picked within the respective possible ranges of variation. The NN is able to detect quantitative relationships between a set of input parameters and the desired output parameters, in this case the sediment properties. The NN can be considered as sufficiently trained, if it can predict the output parameters for an arbitrary synthetic seismogram that does not belong to the trainings set. An example of the ability of a well-trained NN to predict sediment parameters for a three-layer case, i.e., water column, first sediment layer and underlying half-space, is shown in FIG. 7.

|  | Theoretical | Predicted |
| --- | --- | --- |
| Thickness of $1^{st}$ layer (m) | 7.56 | 7.56 |
| P-wave velocity (ms$^{-1}$) | 1574 | 1574 |
| Density (kg m$^{-3}$) | 1529 | 1531 |
| Porosity | 0.507 | 0.507 |
| S-wave velocity (ms$^{-1}$) | 316 | 318 |
| Permeability (m$^2$) | $1.57 \times 10^{-14}$ | $1.57 \times 10^{-14}$ |
| Fines (%) | 22 | 22 |
| Montmorillonite (% of fines) | 22 | 20 |

Figure 7:
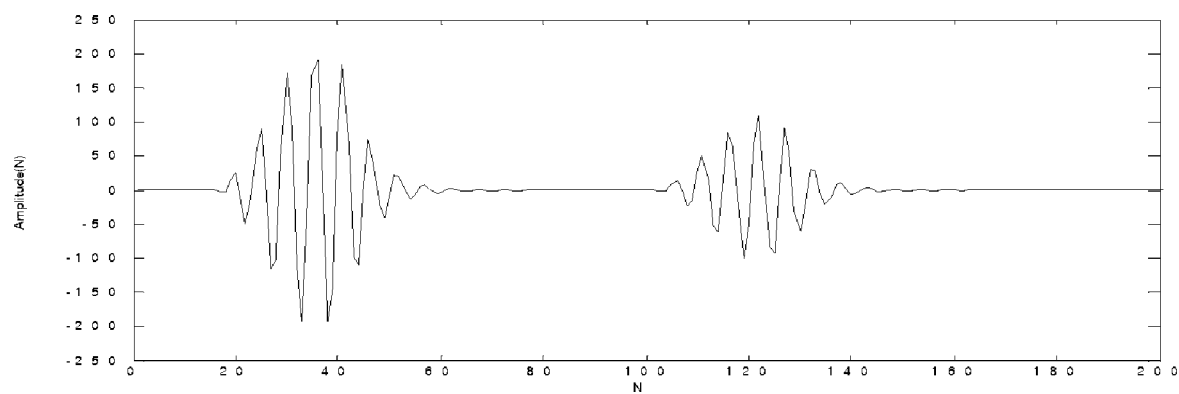
FIG. 7 shows a synthetic seismogram calculated from a sediment layer with pre-defined physical properties overlying a half space.

FIG. 7 shows a synthetic seismogram (amplitude as a function of time in msec) calculated from a sediment layer with pre-defined physical properties overlying a half space (top).

Values of the pre-defined properties and those predicted from the seismogram are shown in the $2^{nd}$ & $3^{rd}$ columns respectively. The predicted values are typically within ~1% of the theoretical values except for montmorillonite (~10%).

The application of this NN to measured seismic reflection profiling data from Galway Bay in a preliminary test on unprocesses seismograms (FIG. 8) has resulted in the following parameters for the first sediment layer (Table 1). The values of this set of parameters is strongly indicative of sand, in agreement with grain-size analyses of grab samples that had identified fine sand in the area (O'Connor, B. (1991) "The use of hydrodynamic mathematical models in predicting types of subtidal macro-faunal communities," in: Modelling the benthos, Report: COST 647 'Coastal Benthic Ecology', Yerseke, Netherlands, 125-136).

Figure 8:
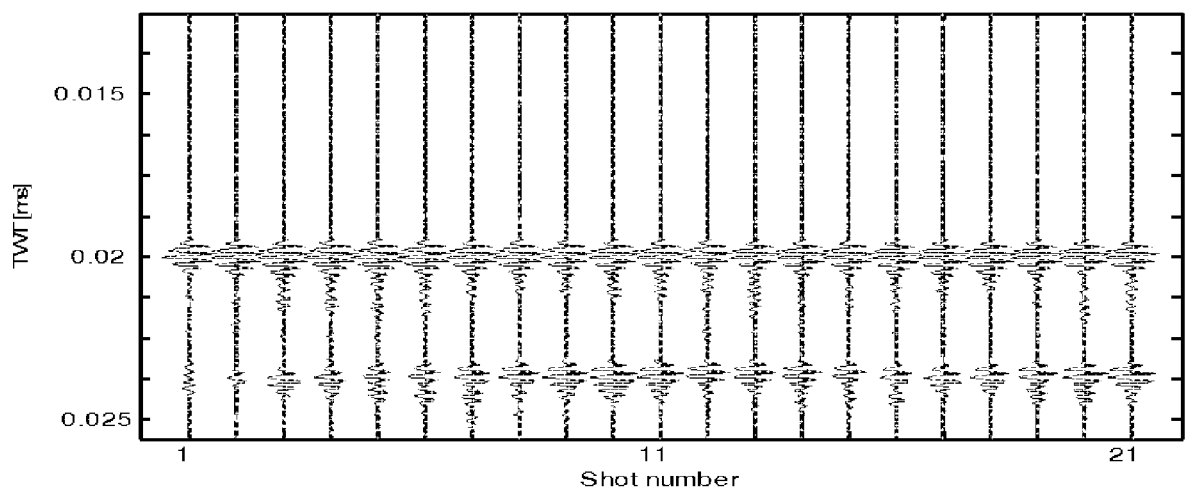
FIG. 8 shows a seismic section near the Aran Islands, Galway Bay.

FIG. 8 shows a seismic section near the Aran Islands, Galway Bay. Successful estimates of the thicknesses and physical properties of the first sediment layer are obtained from the seismograms (except shot numbers 2, 6, 12, 15-17) using a preliminary neural-network inversion scheme. The seismic data were collected in 13 m of seawater using a 3.5 kHz profiler.

| Vp [m/s] | 685 | 684 | 684 | 685 | 685 | 685 | 685 | 679 |
|---|---|---|---|---|---|---|---|---|
| Thickness [m] | .4 | .6 | .6 | .6 | .5 | .5 | .5 | .2 |
| Density [kg/m$^3$] | 991 | 989 | 989 | 991 | 991 | 991 | 991 | 982 |
| Porosity | .42 | .42 | .42 | .42 | .42 | .42 | .42 | .42 |
| Permeab. [mD] | 9 | 8 | 8 | 8 | 8 | 8 | 8 | 9 |
| Fines | .07 | .08 | .08 | .08 | .08 | .08 | .08 | .07 |
| Vp [m/s] | 686 | 685 | 680 | ... | 686 | 686 | 683 | 686 |
| Thickness [m] | .4 | .4 | .4 | ... | .6 | .6 | .5 | .6 |
| Density [kg/m$^3$] | 992 | 991 | 984 | ... | 992 | 992 | 987 | 992 |
| Porosity | .41 | .42 | .42 | ... | .42 | .42 | .42 | .42 |
| Permeab. [mD] | 9 | 9 | 9 | ... | 8 | 8 | 9 | 8 |
| Fines | .07 | .08 | .09 | ... | .09 | .09 | .09 | .09 |

Table 1: Parameters for the first sediment layer as determined by neural-network inversion of seismic data from Galway Bay.

The words "comprises/comprising" and the words "having/including" when used herein with reference to the present invention are used to specify the presence of stated features, integers, steps or components but does not preclude the presence or addition of one or more other features, integers, steps, components or groups thereof.

It is appreciated that certain features of the present invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A method for the quantitative characterization of a seabed sediment composition and a seabed's layered subbottom structure from at least one normal-incidence, single-channel reflection acoustic amplitude time series seismogram, the method comprising the steps of:
   detecting with a computer a plurality of reflections from subbottom interfaces in said seismogram;
   determining traveltime, polarity and reflectivity of each detected reflection;
   determining intrinsic attenuation of a sediment layer between pairs of adjacent reflections;
   determining acoustic properties, layer thicknesses and material properties of the seabed's layered subbottom structure as a function of said determined traveltime, polarity and reflectivity of each detected reflection and said intrinsic attenuation of the sediment layer between pairs of adjacent reflections with said computer.

2. The method of claim 1, wherein the step of determining traveltimes comprises using an estimation of a source wavelet, deformed according to a pre-defined set of attenuation values, in a cross-correlation process with the respective seismogram.

3. The method of claim 1, wherein the step of determining the intrinsic attenuation comprises using an estimation of a source wavelet, deformed according to a pre-defined set of attenuation values, in a cross-correlation process with the respective seismogram.

4. The method of claim 1, wherein the step of determining the reflectivity of each detected reflection comprises determining a maxima of a respective envelope of each reflection.

5. The method of claim 1, wherein the step of determining the acoustic properties, layer thicknesses and material properties of the seabed's layered subbottom structure as a function of said determined traveltime, polarity and reflectivity of each detected reflection and said intrinsic attenuation of the sediment layer between pairs of adjacent reflection, comprises developing a forward model describing physical relationships between the material properties and the acoustic properties of said seabed sediment.

6. The method of claim 5, wherein said forward model comprises:
   a quantitative model of a fine-structure of a clay fraction within said seabed sediment and of a mechanical response resulting from specifications of said fine-structure, and
   a quantitative model of an overall structure of a sediment's frame and of a mechanical response resulting from specifications of said overall structure.

7. The method of claim 6, further comprising the steps of:
   determining the acoustic properties, layer thicknesses and material properties of a seabed's layered subbottom structure in an inversion scheme whose input parameters are said traveltimes, polarities and reflectivities of the detected reflections and said intrinsic attenuation of the sediment layer between pairs of adjacent reflections.

8. The method of claim 1, wherein a series of seismograms are used for quantitative characterization of a seabed sediment composition and a seabed's layered subbottom structure across an area of the seabed.

9. The method of claim 1, wherein a computer readable medium is configured with instructions which when executed by a processor, cause the processor to perform the method according to claim 1.

10. A method of generating a synthetic seismogram from a pre-defined layered structure of unconsolidated seabed sediments whose material properties are described by a set of parameters, comprising the steps of:
   developing with a computer a forward model describing physical relationships between material properties and acoustic properties of said seabed sediments, said forward model comprising:
   a quantitative model of a fine-structure of a clay fraction within said seabed sediments and of a mechanical response resulting from specifications of said fine-structure, and
   a quantitative model of an overall structure of a sediment's frame and of a mechanical response resulting from specifications of said overall structure; and
   processing with a computer said set of material property parameters with said forward model to derive said synthetic seismogram.

11. The method of claim 10, wherein each grain of said seabed sediment in the forward model is spherical in shape.

12. The method of claim 11, wherein said forward model replaces an actual grain-size distribution of said seabed sediment by two grain sizes.

13. The method of claim 12, wherein a size ratio of the two grain sizes is of an order of about 100.

14. The method of claim 12, wherein the forward model considers packings of the two grain sizes independently.

15. The method of claim 12, wherein the forward model considers a material of smaller grain fraction as an anelastic two-phase system, consisting of an elastic matrix interspersed with fluid-filled low-aspect ratio ellipsoidal inclusions, representing interlayer water in expandable clay minerals, that are connected with pore space of an overall structure along their complete peripheries.

16. The method of claim 12, wherein said forward model considers a shear modulus of the larger grains to be elastic and the shear modulus of the smaller grains to be complex and frequency-dependent.

17. The method of claim 12, wherein said forward model considers complex and frequency-dependent shear modulus of smaller grains as being a consequence of stress-induced squirt-flow from low-aspect ratio inclusions in the smaller-grain fraction into pore space of the overall structure of the sediment's frame.

18. The method of claim 10, wherein said forward model quantitatively describes stress-induced radial squirt-flow processes, in an immediate contact region between sediment grains within the overall structure of the sediment's frame as a function of effective pressure.

19. The method of claim 18, wherein bulk and shear moduli of the overall structure of the sediment's frame are complex and frequency-dependent.

20. The method of claim 19, wherein said complex and frequency-dependent bulk and shear moduli of the overall structure of the sediment's frame are considered a consequence of both the said squirt-flow from low-aspect ratio inclusions in small-grain fraction and the radial squirt-flow processes in an immediate vicinity of grain contacts.

21. The method of claim 10, wherein said forward model considers dependence on depth below seafloor of all pressure-dependent parameters.

22. The method of claim 10, wherein said forward model provides a quantitative relationship between porosity and effective pressure over the whole range of depths below the seafloor.

23. The method of claim 10, wherein said forward model provides a quantitative relationship between porosity and composition.

24. The method of claim 10, wherein said set of material property parameters, comprises only:
   a. seawater density,
   b. seawater bulk modulus,
   c. seawater viscosity,
   d. thicknesses of sediment layers, and for each layer
   e. volume content of carbonates,
   f. volume content of small grain-materials, and
   g. volume content of expandable clay minerals.

25. The computer implemented method of claim 10, wherein a computer readable medium is configured with instructions which when executed by a processor, cause the processor to perform the method according to claim 10.

26. A computer readable medium programmed with instructions which when executed by a processor provide a forward model describing physical relationships between material properties and acoustic properties of seabed sediment, the computer readable medium comprising:
   instructions for providing a quantitative model of fine-structure of clay fraction within said seabed sediment and of mechanical response resulting from specifications of said fine-structure, and
   instructions for providing a quantitative model of overall structure, comprising grains having two grain sizes, of said sediment's frame and of mechanical response resulting from specifications of said overall structure.

27. The computer readable medium of claim 26, wherein each grain of said seabed sediment is spherical in shape.

28. The computer readable medium of claim 26, wherein a size ratio of the two grain sizes is of the order of about 100.

29. The computer readable medium of claim 26, wherein packings of the two grain sizes are considered independently.

30. The computer readable medium of claim 26, wherein material of smaller grain fraction is as an anelastic two-phase system, consisting of an elastic matrix interspersed with fluid-filled low-aspect ratio ellipsoidal inclusions, representing interlayer water in expandable clay minerals, that are connected with pore space of the overall structure along their complete peripheries.

31. The computer readable medium of claim 26, wherein shear modulus of larger grains is elastic and shear modulus of the smaller grains is complex and frequency-dependent.

32. The computer readable medium of claim 26, wherein complex and frequency-dependent shear modulus of smaller grains are a consequence of the stress-induced squirt-flow from low-aspect ratio inclusions in smaller-grain fraction into pore space of the overall structure of the sediment's frame.

33. The computer readable medium of claim 26, wherein stress-induced radial squirt-flow processes, in immediate contact region between sediment grains within overall structure of sediment's frame, are a function of effective pressure.

34. The computer readable medium of claim 26, wherein bulk and shear moduli of overall structure of the sediment's frame are complex and frequency-dependent.

35. The computer readable medium of claim 26, wherein complex and frequency-dependent bulk and shear moduli of overall structure of sediment's frame are a consequence of both said squirt-flow from low-aspect ratio inclusion in small-grain fraction and radial squirt-flow processes in immediate vicinity of grain contacts.

36. The computer readable medium of claim 26, wherein the model provides for dependence on depth below the seafloor of all pressure-dependent parameters.

37. The computer readable medium of claim 26, wherein the model provides a quantitative relationship between porosity and effective pressure over a range of depths below the seafloor.

38. The computer readable medium of claim 26, wherein the model provides a quantitative relationship between porosity and composition.

* * * * *